US012719849B2

(12) United States Patent
Deniaud et al.

(10) Patent No.: US 12,719,849 B2
(45) Date of Patent: Aug. 25, 2026

(54) AUTHENTICATION SERVICE AND CERTIFICATE EXCHANGE PROTOCOL IN WIRELESS AD HOC NETWORKS

(71) Applicant: AIRBUS DS SAS, Elancourt (FR)

(72) Inventors: Thierry Deniaud, Montigny le Bretonneux (FR); Romain Carnus, Nanterre (FR)

(73) Assignee: AIRBUS DS SAS, Elancourt (FR)

( * ) Notice: Subject to any disclaimer, the term of this patent is extended or adjusted under 35 U.S.C. 154(b) by 3092 days.

(21) Appl. No.: 14/654,621

(22) PCT Filed: Nov. 18, 2013

(86) PCT No.: PCT/EP2013/003461
§ 371 (c)(1),
(2) Date: Jan. 11, 2016

(87) PCT Pub. No.: WO2014/094948
PCT Pub. Date: Jun. 26, 2014

(65) Prior Publication Data

US 2016/0142213 A1 May 19, 2016

(30) Foreign Application Priority Data

Dec. 21, 2012 (FR) .................................... 12/03585

(51) Int. Cl.
*H04L 9/32* (2006.01)
*H04L 9/30* (2006.01)
(Continued)

(52) U.S. Cl.
CPC .............. *H04L 9/3263* (2013.01); *H04L 9/30* (2013.01); *H04L 61/2503* (2013.01);
(Continued)

(58) Field of Classification Search
None
See application file for complete search history.

(56) References Cited

U.S. PATENT DOCUMENTS 8,098,818 B2 * 1/2012 Grilli .................... H04L 12/189 380/270
2005/0141706 A1 * 6/2005 Regli .................... H04L 9/0836 380/44
(Continued)

OTHER PUBLICATIONS

International Search Report as issued in International Patent Application No. PCT/EP2013/003461, dated Apr. 7, 2014.
(Continued)

*Primary Examiner* — Brandon Hoffman
(74) *Attorney, Agent, or Firm* — Pillsbury Winthrop Shaw Pittman LLP

(57) ABSTRACT

A method for protecting data transmission in an ad hoc network including nodes, each node including a private key, a public key and a certificate of the public key signed by a certification authority, the method including transmitting by the first node to the second node: a first message signed with the private key of the first node; a third message containing a first set of initialization data including: a first certificate including the public key of the first node, signed by the certification authority; a second data set including the IP address of the first node; and the first certificate associated with the IP address of the first node, wherein the second data set is signed with the private key of the first node.

18 Claims, 7 Drawing Sheets

(51) Int. Cl.
*H04L 9/40* (2022.01)
*H04L 61/2503* (2022.01)
*H04W 12/06* (2021.01)
*H04L 101/668* (2022.01)

(52) U.S. Cl.
CPC ......... *H04L 63/0823* (2013.01); *H04W 12/06* (2013.01); *H04L 61/6068* (2013.01); *H04L 2209/24* (2013.01); *H04L 2209/64* (2013.01)

(56) References Cited

U.S. PATENT DOCUMENTS

2008/0069105 A1* 3/2008 Costa .................. H04L 63/0853 370/392
2012/0011360 A1* 1/2012 Engels .................... H04L 9/006 713/166
2013/0091582 A1* 4/2013 Chen ...................... G06Q 10/10 726/26

OTHER PUBLICATIONS

International Preliminary Report on Patentability and the Written Opinion of the International Searching Authority as issued in International Patent Application No. PCT/EP2013/003461, dated Jun. 23, 2015.
Adnane, A., et al., “Trust-based countermeasures for securing OLSR protocol,” 2009 International Conference on Computational Science and Engineering, pp. 745-752.
Khadidja, A., et al., “New efficient mechanisms to secure OLSR protocol,” 2012 International Conference on Future Generation Communication Technology (FGCT), pp. 46-51.

* cited by examiner

| ID | @IP | CERT (K) | CERT TEMP ($K_t$) |
|---|---|---|---|
| $ID_A$ | $IP_A$ | $C_A$ ($K_A/k_{CA}$) | Cta ($K_{tA}/k_A$) |
| $ID_B$ | $IP_B$ | $C_B$ ($K_B/k_{CA}$) | Ctb ($K_{tB}/k_B$) |
| $ID_C$ | $IP_C$ | $C_C$ ($K_C/k_{CA}$) | Ctc ($K_{tC}/k_C$) |
| ... | ... | ... | ... |

AUTHENTICATION SERVICE AND CERTIFICATE EXCHANGE PROTOCOL IN WIRELESS AD HOC NETWORKS

CROSS-REFERENCE TO RELATED APPLICATIONS

This is the U.S. National Stage of PCT/EP2013/003461, filed Nov. 18, 2013, which in turn claims priority to French Patent Application No. 12/03585, filed Dec. 21, 2012, the entire contents of all applications are incorporated herein by reference in their entireties.

TECHNICAL YIELD

The field of the invention relates to the protecting of transmissions in an ad hoc network and the authentication of nodes such as terminal or network equipment. A problem resides on the architecture of such networks wherein the topology is dynamic and wherein great flexibility in configuration and maximum protection must be provided. The centralised approaches of trust diagrams and of distributing keys are not suitable for such networks. Decentralising the access and authentication controls implies that each node be able to implement at least certain security requirements in order to preserve the integrity of the network, in order to preserve the network from attacks, intrusions or the usurpation of identities or the substitution of network addresses.

PRIOR ART AND TECHNICAL PROBLEMS ENCOUNTERED

Routing protocols allow the nodes to know the topology of the network, to calculate the routes to reach the other nodes and to distribute to the various nodes of the network the routes calculated as such. Furthermore, a routing protocol can integrate security elements in order to protect the network from internal or external attacks (unauthorised intrusion in the network, identity usurpation, corruption of the data of a message, etc.). Protecting the routing protocol is necessary in order to preserve the integrity of the network.

The OLSR protocol, of which the acronym means "Optimized Link State Routing Protocol", is particularly suited to ad hoc networks of the mobile and wireless type.

This protocol is based on the use of multipoint relays (MPR) and allows for the exchange of topology information (neighbourhood, state of the links, list of neighbours at a node that has chosen it as MPR) between the various nodes via the HELLO and TC messages. This topology information makes it possible to build the routing tables used in routing the data packets.

However, the OLSR protocol does not include all of the security layers required for complete protection of an ad hoc network. By way of example, the OLSR protocol does not take into account the problems concerning authentication, in particular with regards to the arrival of a new node in the network. A malicious node can also usurp the identity of a healthy node. A malicious node can also corrupt the messages of the routing protocol in order to transform the topology of the network as seen by all of the nodes (including healthy nodes) to its liking.

In order to partially resolve the problem of security and shield against exterior and interior network attacks, the authentication of nodes, distributing keys and the signing of messages can make it possible to protect a network.

For this, solutions have been proposed in order to be compatible with the OLSR protocol. There is the SOLSR protocol, which means "Secure OLSR" (based on signatures for authenticating OLSR packets and on the use of symmetric keys); the solution called "Web-of-trust OLSR extension" (based on signatures for authenticating OLSR packets; the distribution of keys carried out through a principle based on the "PGP web-of-trust"). These solutions were implemented in the form of plug-ins for the daemon OLSRd. These latter improvements make it possible to take certain authentication problems into account in order to meet the requirements of a secure network.

Another solution is a solution based on the OLSR protocol that implements new types of messages (signature message) in order to authenticate the HELLO and TC messages. These messages make it possible to distribute signatures, implement timers or to manage the number and the sequences of messages in order to carry out controls.

A mechanism with a public key and private keys can be implemented to make it possible to encrypt data transmitted in the network. A mechanism for distributing authentication certificates can be associated with the preceding mechanism in order to guarantee the trust that a node can convey to another node. This solution makes it possible to increase the level of security of an ad hoc mobile network.

However, such mechanisms do not make it possible to prevent internal attacks coming from the network such as those referred to as "link-spoofing" (masquerade).

With regards to distributing the security elements required for authenticating nodes, there are two approaches:

- a centralised approach (examples: Kerberos rather for fixed networks; "Public Key Infrastructure" based on a certification authority but requiring the constant presence of a central entity);
- a decentralised approach (examples: "web-of-trust" PGP type but with the problems in distributing certificates; distributed "Public Key Infrastructure").

DISCLOSURE OF THE INVENTION

The invention makes it possible to overcome the aforementioned disadvantages.

The invention proposes a method for protecting the data transmitted at the emission and for controlling this data at reception, by using a public key in order to in particular protect the CT control messages of the OLSR protocol.

A first object of the invention relates to a method for the protecting of the transmission of data in an ad hoc network, with said network comprising a plurality of nodes, with the data being transmitted according to a routing protocol from a first node to a second node, each node comprising a private key ki, a public key Ki, a certificate Ci of the public key Ki signed by a certification authority CA.

Furthermore, the first node transmits to the second node:

- at least one first message signed $M_1/k_A$ with the private key of the first node;
- at least one third message to the second node when a second message coming from the second node is received by the first node following the emission of the first message, the third message containing a first set of initialisation data comprising:
- a first certificate including the public key of the first node signed by the certification authority, designated as $K_A/k_{CA}$;
- a second data set $ENS_2$ comprising:
- the IP address of the first node;
- the first certificate associated with the IP address of the first node, wherein the second data set $ENS_2/k_A$ is signed with the private key of the first node.

Advantageously, each node comprises, furthermore, a temporary private key $k_{ti}$ and a temporary public key $K_{ti}$, wherein the temporary keys comprise a predefined life span, the first data set comprising also:

a second certificate comprising the temporary public key $K_{tA}$ of the first node signed with the private key of the first node, designated as $K_{tA}/k_A$;

a third data set $ENS_3$ further comprising:

i. the IP address of the first node;

ii. the second certificate associated with the IP address of the first node, wherein the third data set $ENS_3/k_{tA}$ is signed with the temporary private key of the first node.

A second object of the invention relates to a method for protecting the transmission of data in an ad hoc network, said network comprising a plurality of nodes, with the data being transmitted according to a routing protocol from a first node to a second node, each node comprising a private key ki, a public key Ki, a certificate Ci of the public key signed by a certification authority CA, a temporary private key $k_{ti}$ and a temporary public key $K_{ti}$, wherein the temporary keys comprises a predefined life span.

Furthermore, the first node transmits to the second node:

at least one first message signed $M_1/k_{tA}$ with the temporary private key of the first node;

at least one third message to the second node when a second message coming from the second node is received by the first node following the emission of the first message, the third message comprising a third set of initialisation data comprising:

a second certificate comprising the temporary public key of the first node signed with the private key of the first node, designated as $K_{tA}/k_A$;

a fourth data set $ENS_4$ comprising:

the IP address of the first node;

the second certificate associated with the IP address of the first node, wherein the fourth data set $ENS_4/k_{tA}$ is signed with the temporary private key of the first node.

Advantageously, the method for protecting the transmission designating the second object of the invention can be carried out consecutively to the first object of the invention.

Advantageously, the $p^{th}$ node transmits to a $q^{th}$ node routing data coming from the first node, called the "generator node" of the message, with the $p^{th}$ and $q^{th}$ nodes being nodes calculated on the route that make it possible to convey a message from a generator node to a destination node. Wherein said data transmitted from the $p^{th}$ node to the $q^{th}$ node comprises:

at least one first message signed $M_1/k_{tA}$ with the temporary private key of the first node;

at least one third message $M_3$ when a second message $M_2$ coming from the second node is received by the first node following the emission of the first message, the third message comprising:

either a first set of initialisation data comprising:

the first certificate $K_A/k_{CA}$ comprising the public key ($K_A$) of the first node signed by the certification authority CA, designated as $K_A/k_{CA}$;

a second data set $ENS_2$ comprising:

the IP address of the first node;

the first certificate associated with the IP address of the first node, wherein the second data set $ENS_2/k_A$ is signed with the private key kA of the first node.

or a third set $ENS_3$ of initialisation data comprising:

a second certificate $K_{tA}/k_A$ comprising the temporary public key of the first node signed with the private key of the first node;

a fourth data set $ENS_4$ comprising:

the IP address of the first node;

the second certificate associated with the IP address of the first node, wherein the fourth data set $ENS_4/k_{tA}$ is signed with the temporary private key $k_{tA}$ of the first node.

A third object of the invention relates to a method for controlling the authentication data by a second node, with the authentication data able to ensure the protection of the useful data exchanges transiting from a first node to a second node, with the authentication data being transmitted by the first node defined previously in one of the first two objects of the invention to a second node.

The method comprises:

an extraction of the data received by the second node including:

the first certificate $K_A/k_{CA}$ extracted from the first message sent by the first node and;

the second data set $ENS_2/k_A$ signed with the private key of the first node of the third message;

a generating of an acknowledgement upon reception of the first message to the first node;

a recording of the data extracted in a memory of the second node;

a comparing of the certificates of the two messages contained in respectively the first and third messages enabling a verification of the authentication of the first node.

Advantageously, the recording of the data is carried out in such a way as to bijectively cause the following three pieces of data to correspond:

a unique identification of the first node;

an IP address of the first node;

a first certificate of the public key of the first node signed by the certification authority.

Advantageously, the extraction of the data received by the second node comprises the extraction:

of a second certificate $K_{tA}/k_A$ from the first message;

of the fourth data set $ENS_4/k_{tA}$ signed with the temporary private key $k_{tA}$ of the first node of the third message.

Advantageously, the recording of the data is carried out in such a way as to cause the following three pieces of data to correspond:

a unique identification of the first node;

an IP address of the first node;

a first certificate of the public key of the first node signed by the certification authority;

a second certificate $K_{tA}/k_A$ of the temporary public key $K_{tA}$ of the first node signed with the private key of the first node.

Advantageously, the routing protocol is the OLSR protocol and the first message is a message of the HELLO or TC type.

Advantageously, at least one node comprises a terminal mobile.

Another object of the invention relates to a node of an ad hoc network protecting the transmission of data by implementing the method for protecting of the invention.

Another object of the invention relates to a node of an ad hoc network, that controls the authentication data of an emitting node by the implementing of the method for protecting of the invention.

BRIEF DESCRIPTION OF THE FIGURES

Other characteristics and advantages of the invention shall appear when reading the following detailed description, in reference to the annexed figures, which show.

DESCRIPTION OF THE INVENTION

In the rest of the description, a "generator node" refers to the first node that sends a message of a routing protocol to a destination node, with the message travelling through a route calculated by a routing table and in general comprising a plurality of intermediate nodes.

An "emitting node" is a node that generates a message or that transfers it to a neighbouring node which is on a route with the destination of a destination node.

A "receiving node" is a node that receives a message that as either intended for it, or not intended for it. In this latter case, the receiving node after data processing, such as authentication control, authorises or does not authorise the transfer of the message to the destination node or the next neighbouring node on the route.

In the rest of the description, the authentication functions include the functions that are normally used for the authentication services and also include the methods of the invention which constitute services that improve the security of the data transfers in an ad hoc network.

Figure 1:
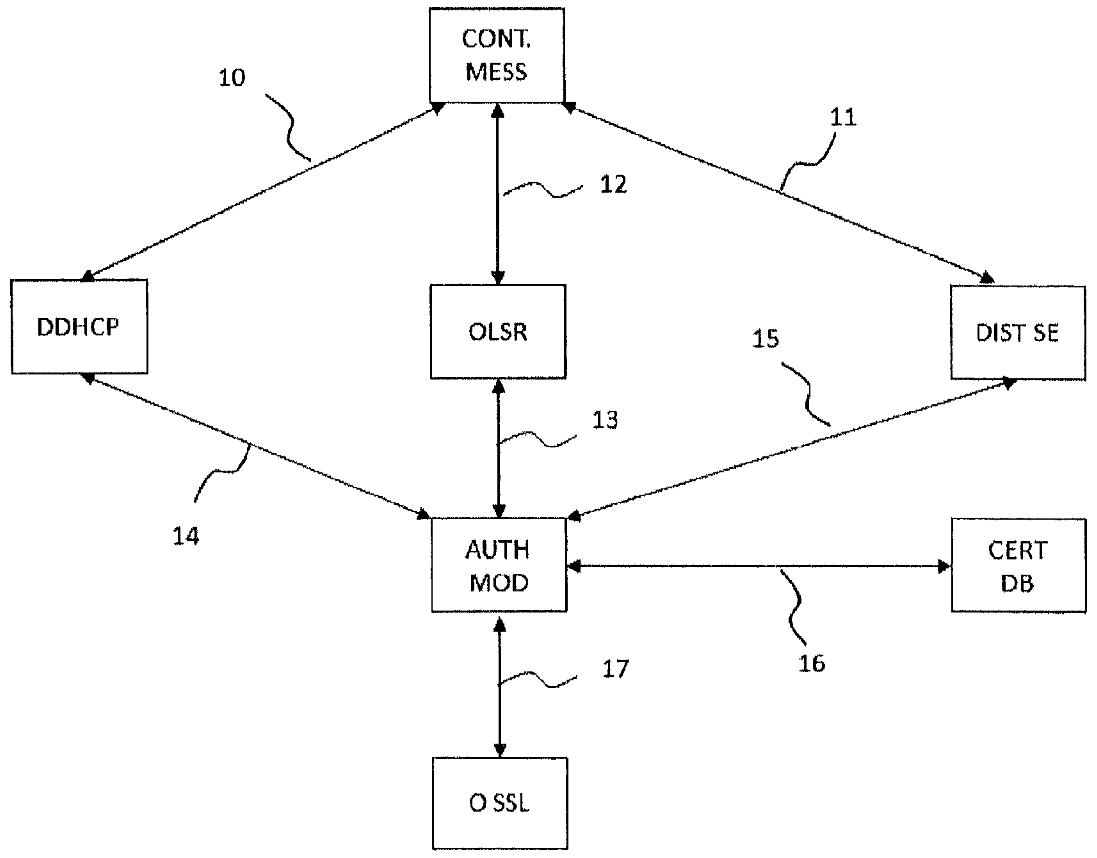
FIG. 1: a message authentication model of the invention, shared by the various network services that generate control traffic.

FIG. 1 shows an architecture representing the essential components for the implementation of the methods of the invention. According to an embodiment, the OLSR component makes it possible to process the incoming and outgoing messages relating to the OLSR routing protocol. The functions that make it possible to manage the interface of the node for the receiving and sending of control messages are represented by a "CONT. MESS" component in FIG. 1. The interactions between the OLSR and CONT. MESS components are represented by the link 12. A generator node seen by a receiving node can take part in the topology of the network and the information and the data relating to the generator node can then be saved in the table "ID TABLE" which is described hereinafter when the OLSR messages have been accepted after authentication control.

A DDHCP component makes it possible to process the incoming and outgoing messages relating to the DDHCP protocol. The interactions between the DDHCP and CONT. MESS components are represented by the link 10. The IP address obtained by the protocol can then be saved in the table "ID TABLE" which is described hereinafter when the messages have been accepted after authentication control.

An additional "DIST SE" component makes it possible to process the incoming and outgoing messages relating to a distributed service other than DDHCP and OLSR. The interactions between the DIST SE and CONT. MESS components are represented by the link 11.

An AUTH MOD component handles the operations for verifying the validity of the authentication (signature verification) for the incoming messages associated with the protocols DDHCP (link 14), OLSR (link 13) or with any other distributed service (link 15). This AUTH MOD component also handles calculating signatures of the outgoing messages associated with the protocols DDHCP (link 14), OLSR (link 13) or any other distributed service (link 15) when the node is the generator node of the message. The authentication method for protecting the control traffic is based on public key cryptography. The distributed services must be adapted so that the protocol messages transport the signature and identifier.

The CERT DB component makes it possible to manage authentication certificates of the node and authentication certificates known to the node that stores them. The authentication certificates can be saved in a base that is updated on a regular basis. An interface 16 allows the control functions and authentication data managers to access the CERT DB authentication certificates.

The O SSL component makes it possible to store the cryptographic tools used by the authentication functions of the AUTH MOD component. This can be a function library such as for example a hash function or a data encryption function. The AUTH MOD component accesses the services of the O SSL component by means of an interface 17.

Finally, the AUTH MOD component with the CERT DB component makes it possible to save and organise the authentication data in such a way as to guarantee the authentication of the nodes entering into communication with the node considered in FIG. 1. Furthermore, the AUTH MOD component makes it possible to provide a high level of security in particular relating to exterior intrusions and substitutions within the network itself. The AUTH MOD and CERT DB components make it possible to execute the methods of the invention and details are provided hereinafter.

Figure 2:
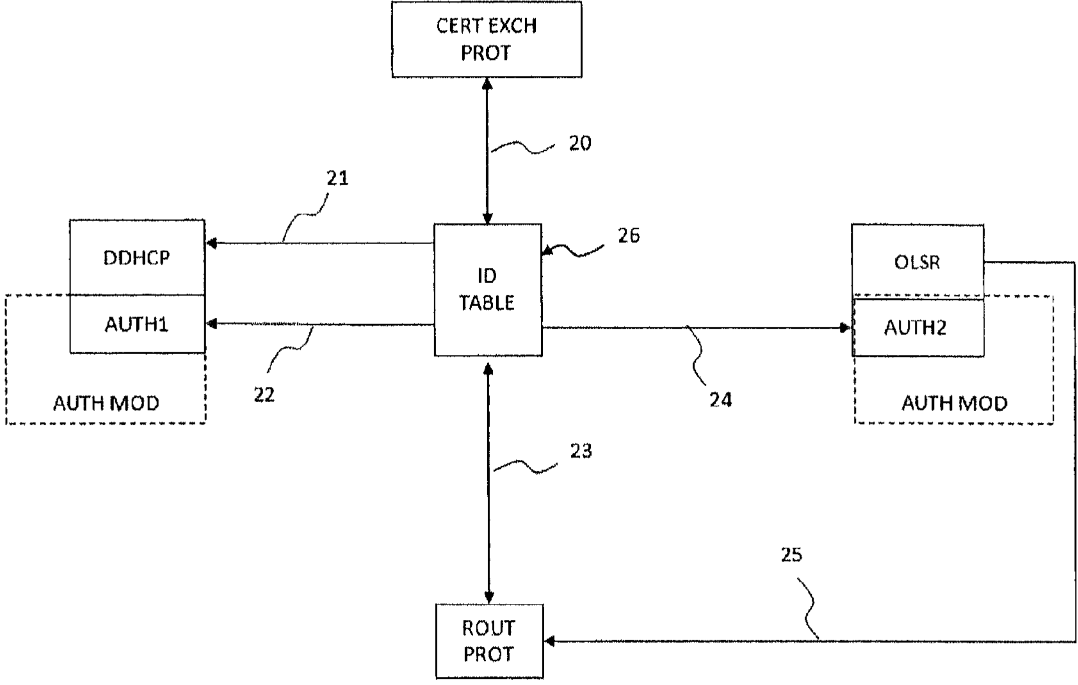
FIG. 2: an architecture diagram centred around a database called ID TABLE, which includes all of the elements enabling the authentication of the messages and the protection of protocols.

FIG. 2 makes it possible to describe in further detail the various functions required to carry out the methods of the invention. The CERT DB component comprises a data table that groups together various authentication data stored in a node. The authentication data concerning the data of the nodes known to a given node of the network in particular those stored in the routing table, designated as ROU PROT, in FIG. 2. In particular, the authentication data is saved in a table 26, designated as ID TABLE, in FIG. 2. The table ID TABLE makes it possible to associate with an identifier of a known node, a corresponding authentication certificate. This association makes it possible to control the authentication of a received message coming from a node known to the routing table. The table ID TABLE can be stored in the CERT DB component.

The control method of the invention makes it possible to update the ID TABLE by means of a protocol for exchanging certificates represented by the block CERT EXCH PROT and the link 20. The authentication functions carried out by the AUTH MOD component make it possible to carry out the operations using the data stored in the ID TABLE and the data extracted from the incoming messages (signature verification).

In particular, the authentication of incoming messages relating to the DDHCP protocol can be carried out on the component providing for the implementation of the addressing DDHCP protocol via the AUTH MOD component through the verification of the signature of incoming messages. By using the identifier contained in the signature, the service can retrieve the corresponding certificates in the ID TABLE of the CERT DB component for the signature verification and can verify that the IP address corresponds to that of the generator node. The links 21 and 22 between the ID TABLE and the AUTH1 authentication function of the AUTH MOD component that uses its interface with the DDHCP component is shown in FIG. 2.

In particular, the authentication of incoming messages relating to the OLSR protocol can be carried out on the OLSR routing protocol via the AUTH MOD component through the verification of the signature of incoming messages. Using the identifier contained in the signature, the service can retrieve the corresponding certificates in the ID TABLE of the CERT DB component for the signature verification and can verify that the IP address corresponds to that of the generator node. The link 24 between the ID TABLE and the AUTH2 authentication function of the AUTH MOD component using the OLSR component is shown in FIG. 2.

An advantage of the architecture that makes it possible to carry out the methods of the invention is that the authentication functions are carried out independently of the certificate exchange protocol.

The routing table of a node, designated as ROUT PROT, is shown in FIG. 2. It necessarily interfaces with the OLSR layer making it possible to implement the functions relative to the routing protocol of the ad hoc network. This interface is represented by the link 25 of FIG. 2.

An interface 23 between the routing table ROUT PROT and the ID TABLE makes it possible to carry out controls and synchronisations between the routing table and the table ID TABLE.

A routing protocol other than OLSR, in the same family as OLSR (proactive routing protocol) could however be used when the steps of the methods of the invention can use the functions required for such a routing protocol.

Figure 3:
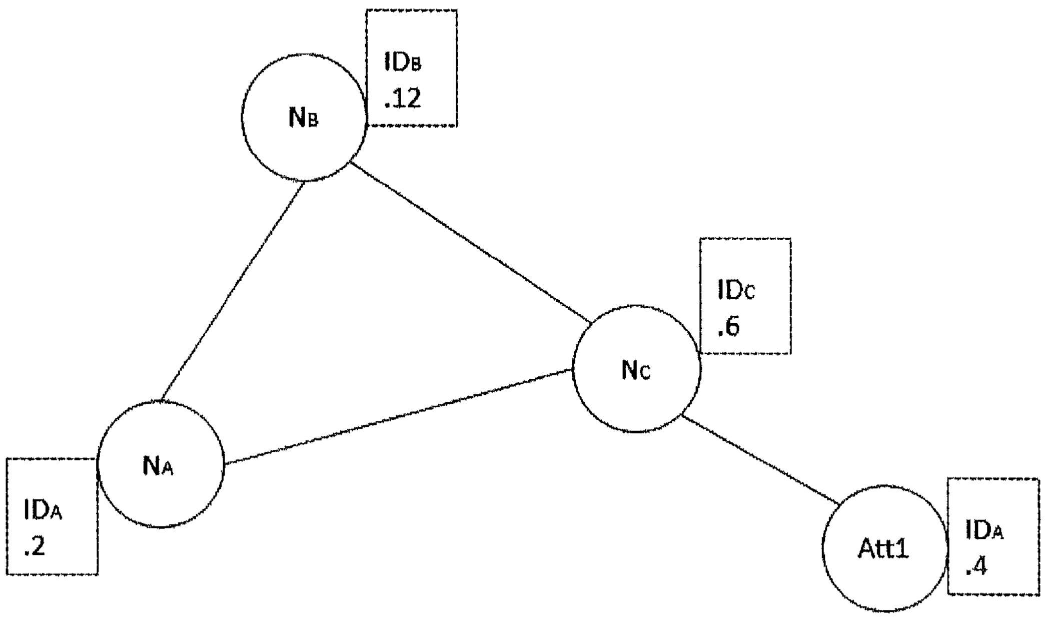
FIG. 3: a response to the intrusion in the network via identity usurpation, according to a method of the invention.
Figure 4:
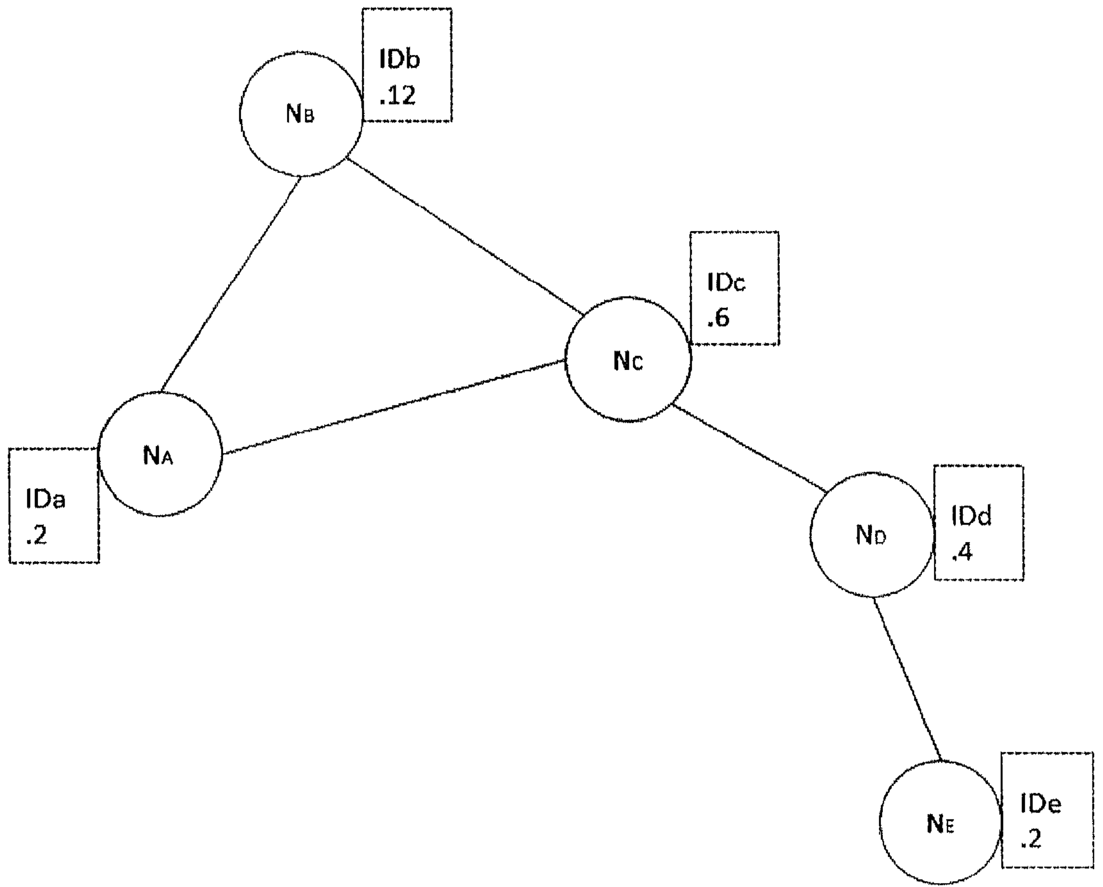
FIG. 4: a response to the intrusion in the network via usurpation of the IP address, according to a method of the invention.

FIGS. 3 and 4 respectively show a case of identify usurpation of a node (FIG. 3) and a case of IP address usurpation (FIG. 4). The methods of the invention make it possible to prevent such attacks within the network.

In particular, the ID TABLE makes it possible to bijectively correspond: an identifier of a node, and IP address and an authentication certificate.

An objective of the table ID TABLE is to allow for the building of a secure table comprising the list of nodes that have validated authentication certifications and which comprise trusted data with regards to nodes known to the routing table. As such a first node which is authenticated by a second node after an authentication control through certificate exchanges according to the method of the invention can transmit messages coming from this node to another node. In this way, the trust of a node is propagated by handing on via a node-to-node control.

Another objective of the table ID TABLE is to store the information relating to the authentication data of the other nodes in such a way as to be able to update this data constantly.

When a node joins the network for the first time, its IP address may not yet be attributed to it when it attempts to reach a node of the network. In this latter case, the ID TABLE does not take into account the IP address field of the node in the table ID TABLE and therefore does not compare this entry with the empty IP address field of the received messages. The IP address will be, subsequently, added to the authentication data in the table when the identification of the node in question is recognised.

FIG. 3 shows a network wherein the following nodes are shown with their addressing and identifier data:

- a first node $N_A$ has an IP address 0.2 and an identifier $ID_A$;
- a second node $N_B$ has an IP address 0.12 and an identifier $ID_B$;
- a third node $N_C$ has an IP address 0.6 and an identifier $ID_C$.

A third-party node designated as Att1 attempts an attack by usurping the identifier of the node $N_A$: $ID_A$ and an IP address IP 0.4.

The control method of the invention makes it possible in particular to organise the authentication data of neighbouring nodes, in such a way that a unique identifier of a node is associated with a unique IP address and with a unique authentication certificate of the same node.

As such the configuration shown in FIG. 3 can be detected thanks to the authentication functions that make use of the data stored and updated in the ID TABLE by comparing the data of the incoming messages and the data stored in the ID TABLE.

FIG. 4 shows a network wherein the following nodes are shown with their addressing and identifier data:

- a first node $N_A$ has an IP address 0.2 and an identifier $ID_A$;
- a second node $N_B$ has an IP address 0.12 and an identifier $ID_B$;
- a third node $N_C$ has an IP address 0.6 and an identifier $ID_C$;
- a fourth node $N_D$ has an IP address 0.4 and an identifier $ID_D$;
- a fifth node $N_E$ has an IP address 0.2 and an identifier $ID_E$.

The fifth node $N_E$ attempts an attack from the inside of the network via usurpation of the IP address 0.2 of the first node $N_A$.

The control method of the invention makes it possible in particular to organise the authentication data of neighbouring nodes, in such a way that a unique IP address of a node is associated with a unique authentication certificate of the same node and with its identifier.

As such the configuration shown in FIG. 4 can be detected thanks to the authentication functions that made use of the data stored and updated in the ID TABLE through the comparison of the data of the incoming messages and of the data stored in the ID TABLE.

When a message is received and authenticated by a node, the AUTH MOD authentication component processes the authentication data in such a way as to record it in the ID TABLE, either by creating a new entry for a new node, or by updating the data that is already recorded.

When the controlled data is identical to the data already present in the ID TABLE, the ID TABLE is not updated. However, comparing the data makes it possible to verify the authentication of messages coming from a node that is known to the routing table and therefore to the ID TABLE.

The received messages when they are signed can be verified thanks to the certificates recorded in the table ID TABLE. In this case the consulting of the base can be carried out by comparing the IP address of the message received and the corresponding IP address stored in the ID TABLE.

Another possible entry is that of the identifiers of nodes.

Figure 5:
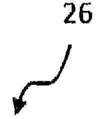
FIG. 5: an example of authentication data storage by a node of the network, according to a control method of the invention.

FIG. 5 shows a table 26 ID TABLE comprising:

- the identifiers ID of the nodes known to the routing table ROUT PROT of a node: $ID_A$, $ID_B$, $ID_C$;

the IP addresses of the nodes known to the data referenced in the DDHCP component: $IP_A$, $IP_B$, $IP_C$;

the certificates $C_i$, designated as CERT (K) in FIG. 5, of the public keys $K_i$ of the nodes i known to the routing table of a node, wherein said keys are signed by a certification authority CA, the certificates are also designated as $K_i/K_{CA}$, the certificates $C_{ti}$, designated as CERT TEMP ($K_t$) in FIG. 5, of the temporary public keys $K_{ti}$ of nodes i known to the routing table of a node, wherein said temporary public keys are signed with the private key ki of the node i, these certificates are also designated as $K_{ti}/k_i$.

Among the authentication functions of the invention, one of them comprises a method for protecting the transmission of data in the network. The method is implemented for the protecting of the transmissions of data of two adjacent nodes communicating through the network.

In this way, the protecting of the transmissions is provided via the implementing of the method by handing on from a first message generating node to a destination node. Between the generator node and the destination node, the nodes cooperate by handing on by transferring the data after controlling the data to be transmitted.

Figure 6:
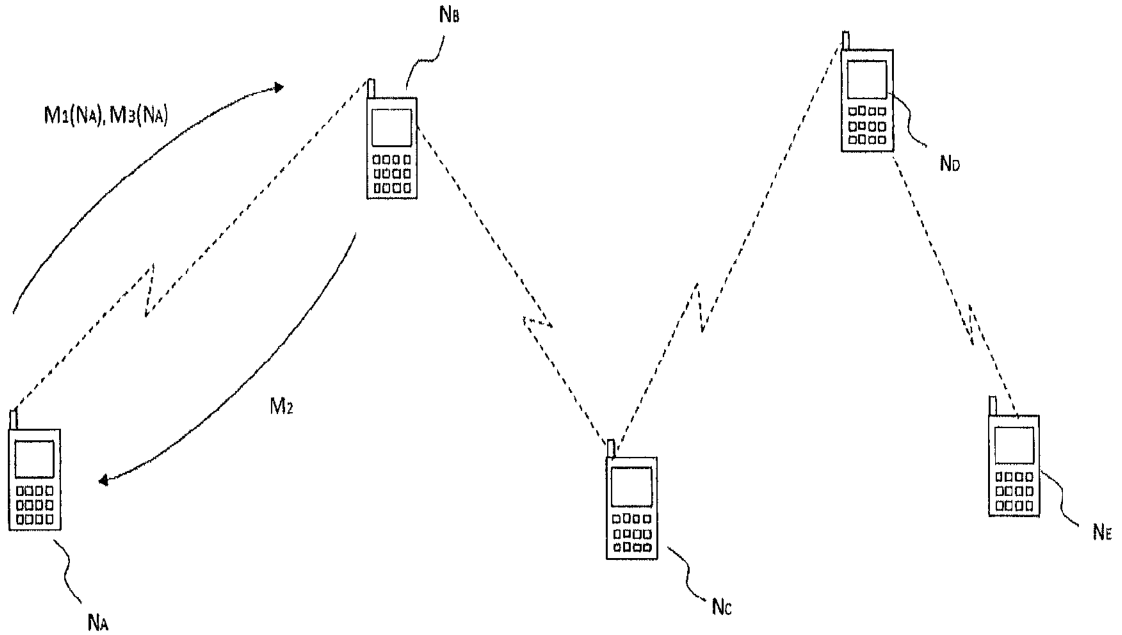
FIG. 6: a first example of data exchange, according to the method for protecting of the invention.

FIG. 6 shows a transmission of messages of a routing protocol from a node $N_A$ to a node $N_B$. The node $N_A$ is a message generating node. The node $N_E$ is the destination node for the messages coming from the node $N_A$.

The nodes $N_B$, $N_C$, $N_D$ represent nodes that transfer, according to a calculated route, the messages from the node $N_A$ to the node $N_E$.

The method for protecting the data transmitted makes it possible to secure the transfer from a first node on the calculated route to its downstream node and so on until the destination node.

The method for protecting of the invention is based on the use of authentication data that has been distributed in the nodes of the network. Among this distributed data, a private key ki, a public key Ki were distributed to each node $N_i$. The authentication data can be distributed by a certification authority.

Furthermore, a certificate is generated with in particular the public key Ki and is signed by the certification authority CA. A certificate that is self-signed by the certification authority CA can also be transmitted in such a way as to distribute the signature of the certification authority. This certificate makes it possible in particular to carry out the signature controls during the reception of signed messages.

FIG. 6 therefore shows a first transmission from the node $N_A$ to the node $N_B$. The node $N_A$ transmits a message to the node $N_B$ of a routing protocol for example OLSR which can for example be a HELLO or TC message.

According to a first embodiment of the method of the invention, at least one transmitted message $M_1$ is signed with the private key of the node $N_A$, the signed message is designated as $M_1/k_A$.

A preliminary step consists in comparing the identifier ID of the generator node $N_A$ with the list of identifiers ID of the nodes known and included in the table ID TABLE. The identifier ID can be transmitted by the intermediary of messages of the OLSR protocol, such as the message $M_1$ which can be either a HELLO message, or a TC message.

If the identifier is known and authenticated thanks to the signature, then the message $M_1$ is transferred to the next node located on a route calculated by the routing protocol. If the identifier is unknown or contains authentication data that is incomplete or outdated, then the method for protecting the data transmitted can be activated.

In this latter case, when the node $N_B$ receives the first message $M_1$, an authentication function can store the signature of the message $M_1$. A second message $M_2$ is emitted from the node $N_B$ to the node $N_A$ in such a way as to request a third message $M_3$.

A third message, on request of the node $N_B$, is therefore generated by the node $N_A$ to the node $N_B$. The third message $M_3$ makes it possible to transmit authentication data of the node $N_A$ in order to protect the transfer of messages through the network. The message $M_3$ comprises data $ENS_1$ comprising:

a first certificate including the public key $K_A$ of the first node $N_A$ signed by the certification authority CA, designated as $K_A/k_{CA}$;

a data set $ENS_2$ comprising:

the address $IP_A$ of the first node $N_A$;

the first certificate associated with the address $IP_A$ of the first node $N_A$.

Furthermore, the data set $ENS_2/k_A$, also designated as $\{IP_A; K_A/K_{CA}\}/k_A$, is signed with the private key $k_A$ of the first node $N_A$.

When the node $N_A$ does not yet have an IP address, the address $IP_A$ is not sent among the data $ENS_2$. The data is stored in the node $N_B$.

The comparison of the data of the message $M_1$ and $M_3$ makes it possible to authenticate the message generator $M_1$ and to establish a trusted link between the two nodes. The signature of the certificates by the certification authority makes it possible to reinforce this link of trust between the two nodes.

The authentication data of the node $N_A$ is saved in the table ID TABLE of the node $N_B$: the identifier of the node $N_A$, the IP address of the node $N_A$ and the certificate of the node $N_A$ when the latter are not present in the table ID TABLE or when the values are not identical to those decoded from the messages.

The message $M_3$, which comprises the data set $ENS_2$ which comprises the IP address of the node A and the signed public key, makes it possible:

on the one hand, to guarantee that the first message $M_1$ is indeed a message coming from the node $N_A$ and;

on the other hand, to associate an IP address of the node $N_A$ with a unique authentication certificate and;

finally, to guarantee that the node $N_A$ is indeed in possession of the private key $k_A$.

As such the node $N_B$ established a secure link with the node $N_A$ in such a way as to process all of the signed messages of the node $N_A$ following this authentication phase.

Another embodiment of the invention can also be processed either competing with this first embodiment, or in a complementary manner.

In this second embodiment, at least one message $M_1$ transmitted by the node $N_A$ is signed with a temporary private key of the node $N_A$, the signed message is designated as $M_1/k_{tA}$.

A temporary private key of a given node is generated by the node itself using authentication data that was transmitted and certified by a certification authority. As such, a portion of the security management is delegated to each node using this authentication data.

The request contained in the message M2 is similar in the second embodiment to the first embodiment. When the node $N_B$ receives the first message $M_1$, an authentication function can store the signature of the message $M_1$. A second message $M_2$ is emitted from the node $N_B$ to the node $N_A$ in such a way as to request a third message $M_3$.

A third message, on the request of the node $N_B$, is therefore generated by the node $N_A$ to the node $N_B$. The third message $M_3$ comprises data $ENS_1$ comprising:

- a first certificate including the public key $K_A$ of the first node $N_A$ signed by the certification authority CA, designated as $K_A/k_{CA}$;
- a second certificate, designated as $K_{tA}/k_A$, comprising the temporary public key $K_{tA}$ of the first node $N_A$ signed with the private key $k_A$ of the node $N_A$;
- a data set $ENS_2$ comprising:
  - the address $IP_A$ of the first node $N_A$;
  - the first certificate associated with the address $IP_A$ of the first node $N_A$.

Furthermore, the data set ENS2/kA, also designated as $\{IPA; K_A/K_{CA}\}/k_A$, is signed with the private key $k_A$ of the first node $N_A$.

- a data set $ENS_3$ comprising:
  - the address $IP_A$ of the first node $N_A$;
  - the second certificate associated with the address $IP_A$ of the first node $N_A$.

Furthermore, the data set $ENS_3/k_{tA}$, also designated as $\{IP_A; K_{tA}/K_A\}/k_{tA}$, is signed with the temporary private key $k_{tA}$ of the first node $N_A$.

The node $N_B$ can request via the message $M_2$ the second certificate and the set $ENS_3$ only if it already knows the node $N_A$ (the node $N_A$ already appears in the ID TABLE).

This embodiment makes it possible to not excessively use the master keys distributed by the certification authority CA. Only the temporary keys are used to sign the messages so as to prevent attacks in the network.

The two embodiments are complementary in that a first authentication can be carried out with the signature of the certification authority between two nodes. Then subsequently, temporary keys can be used so as to limit the use of the master keys distributed by the certification authority CA. An advantage of this complementary use of these two embodiments is to be able to change temporary keys frequently, in such a way as to guarantee a high level of security in the ad hoc network while still limiting the traffic generated by these messages.

Another advantage is to manage a protecting of the transmissions by handing on, i.e. from one node to another.

At each reception of a signed OLSR message, the receiving node of the message M1 engages the control method in such a way as to validate the signature and the authenticity of the message of the emitting node and/or of the generator node before processing the message or transferring it.

Each node emits OLSR messages, such as TC messages, in the network. The propagation of the OLSR messages in the network allows the nodes that discover a new node or a node that has changed authentication data, such as a new certificate, to engage a method for protecting transmissions with this new node.

Figure 7:
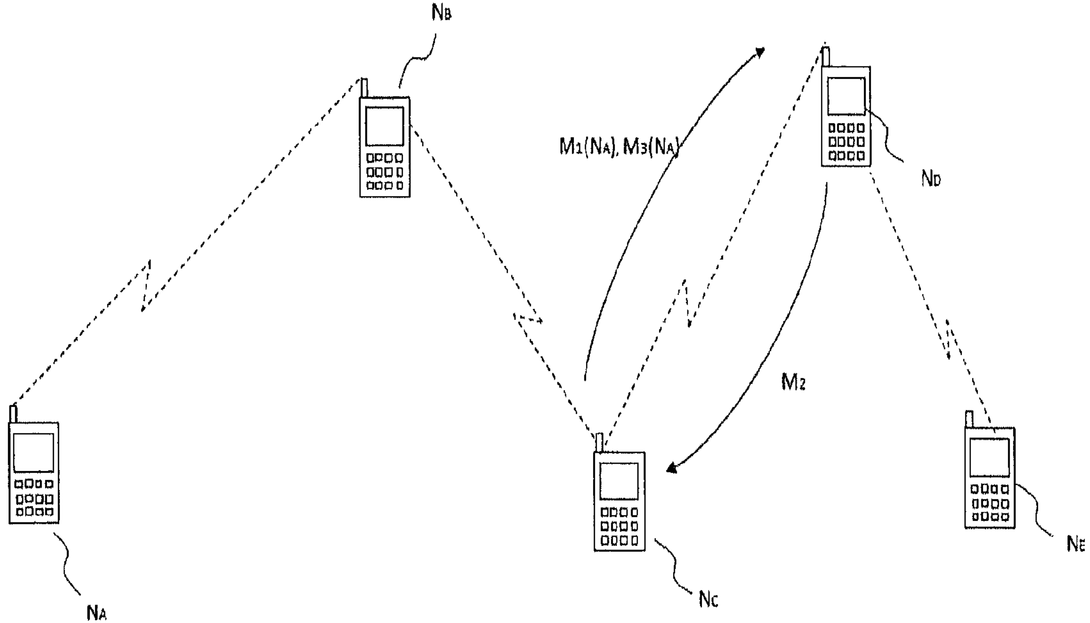
FIG. 7: a second example of data exchange, according to the method for protecting of the invention.

FIG. 7 shows this operation of deployment of the protecting of transmissions by handing on through the network.

The node $N_C$ transmits the message $M_1$ to the node $N_D$. The message $M_1$ is coming from the node $N_A$ and the destination is the node $N_E$. The nodes between the node $N_A$ and the node $N_E$ are transition nodes that aim to control the authentication of the node $N_A$ then to transfer the messages coming from this node if it is trusted to a destination node. The protecting of the transfer is carried out by handing on.

If for example the node $N_D$ does not have an entry in the table ID TABLE of the node $N_A$, an operation similar to that described hereinabove will occur between two consecutive nodes.

The message $M_1$ is signed with the private key of the node $N_A$, either the master private key or the temporary private key according to the embodiment. A message $M_2$ is generated from the node $N_D$ to the node $N_C$ upon reception of the message $M_1$ by the node $N_D$.

The node $N_C$ which has beforehand authenticated the node $N_A$ as a "safe" node, can transmit the message $M_1$ and transfer the data contained in the message $M_3$ as the node $N_C$ has itself saved this information in its table ID TABLE.

The message $M_3$ is therefore sent from the node $N_C$ to the node $N_D$, on request of the node $N_D$. The third message $M_3$ comprises data $ENS_1$ comprising, according to the embodiment retained:

- the first certificate or the first and the second certificates, as defined hereinabove;
- a data set $ENS_2$ or the data sets $ENS_2$ and $ENS_3$ comprising:
  - the address $IP_A$ of the first node $N_A$;
  - the first or the second certificate associated with the address $IP_A$ of the first node $N_A$ according to whether it concerns the data set $ENS_2$ or $ENS_3$.

Furthermore, the data set $ENS_2/k_A$ or $ENS_3/kt_A$, is signed respectively either with the private key of the node $N_A$ or with the temporary private key of the node $N_A$.

The table ID TABLE can store for each entry, i.e. for each newly authenticated node: its IP address, its identifier, a first certificate including the public key of the node signed by the certification authority CA, a second certificate comprising the temporary public key of the node signed with the private key of the node. The table ID TABLE can further comprise:

- a first data set signed with the private key of the generator node of the message, also considered as a first association comprising:
  - the IP address of the generator node of the message, or $N_A$ in the example.
  - the first certificate.
- a second data set signed with the temporary private key of the generator node of the message, $N_A$, also considered as a second association comprising:
  - the IP address of the generator node of the message, or $N_A$ in the example.
  - the second certificate.

Furthermore, each node can comprise a certificate revocation list:

- The second certificates have a limited life span and are renewed periodically. The second obsolete certificates are revoked. The new second certificates are transmitted by handing on by the mechanisms shown in FIGS. 6 and 7. Each node updates its certificate revocation list when it replaces in ID TABLE the old certificate with the new one.
- The first certificate can be revoked by the node that has it.
  - If it has a new first certificate signed by the certification authority, it replaces the first obsolete certificate with the new first certificate, modifies the second certificate (now signed with the new private key), modifies the sets $ENS_2$ and $ENS_3$ consequently. The new first and second certificates are transmitted by handing on by the mechanisms shown in FIGS. 6 and 7. Each node updates its certificate revocation list when it replaces in ID TABLE the old certificate with the new one.
  - If it does not have a new first certificate signed by the certification authority, it must transmit a message $M_4$ signed with the current private key to the nearest trusted nodes that it knows (via the ID TABLE and routing table) indicating that it wants to revoke all of its certificates. When a message $M_4$ is received and after controlling its authenticity, the receiving node updates its table ID TABLE by deleting the entry relating to the generator node of the message $M_4$ and its certificate revocation list and sends an acknowledgement $M_5$ signed with its temporary private key to the generator node of the message $M_4$. The generator node definitively deletes its security elements when it has received a sufficient number of messages $M_5$ for which it has controlled the authenticity. Note that outside of the network, the certification authority must be informed of the revocation of a certificate that it had signed so that it can update its own revocation list.

An intermediate "on hold" state between not revoked and revoked can be introduced so that a node can report the erratic behaviour of another node. This information is introduced into the certificate revocation list of the node that made this observation. The revocation of the certificates of the node in question can be carried out only by the node in question or the certification authority.

The certificate revocation list managed by a node can be transmitted to the other nodes on modification and periodically by the intermediary of a message $M_6$ signed with its temporary private key. The revocation of a certificate by the intermediary of the messages $M_6$ is taken into account by a node (modification of its certificate revocation list) only if it has received and authenticated the revocation of the certificate from a sufficient number of trusted nodes.

The certificate revocation list managed by the certification authority can be transmitted to the nodes via nodes of the network by the intermediary of a message $M_7$ signed by the certification authority. The revocation of a certificate by the intermediary of the messages $M_7$ is immediately taken into account by a node after authentication of the message (modification of its certificate revocation list).

The invention claimed is:

1. A method for protecting transmission of data in an ad hoc network, said network comprising a plurality of nodes, with the data being transmitted according to a routing protocol from a first node to a second node, each node comprising a private key, a public key, and a certificate of the public key signed by a certification authority, the method comprising transmitting by the first node to the second node:

at least one first message signed with the private key of the first node;

at least one third message when a second message coming from the second node is received by the first node following the transmission of the first message, the third message containing a first set of initialisation data comprising:

a first certificate including the public key of the first node signed by the certification authority;

a second data set comprising:

an IP address of the first node;

the first certificate associated with the IP address of the first node;

wherein the second data set is signed with the private key of the first node.

2. The method for protecting according to claim 1, wherein each node further comprises a temporary private key and a temporary public key, wherein the temporary keys comprise a predefined life span, the first set of initialisation data further comprising:

a second certificate comprising the temporary public key of the first node signed with the private key of the first node;

a third data set comprising:

the IP address of the first node;

the second certificate associated with the IP address of the first node;

wherein the third data set is signed with the temporary private key of the first node.

3. The method for protecting according to claim 1, wherein the at least one first message signed with the private key of the first node comprises a first data set and a first signature of the first node.

4. The method for protecting according to claim 3, wherein a hash function is performed on the first data set and the first signature is calculated based on the hashed first data set and the private key of the first node.

5. The method for protecting according to claim 1, wherein the first and third messages are routing protocol messages.

6. A method for protecting the transmission of data in an ad hoc network, said network comprising a plurality of nodes, with the data being transmitted according to a routing protocol from a first node to a second node, each node comprising a private key, a public key, a certificate of the public key signed by a certification authority, a temporary private key and a temporary public key, wherein the temporary keys comprise a predefined life span, with a new pair being generated at the end of the life span of the preceding pair, the method comprising transmitting by the first node to the second node:

at least one first message signed with the temporary private key of the first node;

at least one third message when a second message coming from the second node is received by the first node following the transmission of the first message, the third message comprising a fourth set of initialisation data comprising:

a second certificate comprising the temporary public key of the first node signed with the private key of the first node;

a fifth data set comprising:

an IP address of the first node;

the second certificate associated with the IP address of the first node, wherein the fifth data set is signed with the temporary private key of the first node.

7. A method for protecting the transmission of data in an ad hoc network, said network comprising a plurality of nodes, with the data being transmitted according to a routing protocol from a first node to a second node, each node comprising a private key, a public key, a certificate of the public key signed by a certification authority, a temporary private key, and a temporary public key, wherein each of the temporary keys comprises a predefined life span, with a new pair being generated at the end of the life span of the preceeding pair, the method comprising transmitting by the first node to the second node:

at least one first message signed with the private key of the first node;

at least one third message when a second message coming from the second node is received by the first node following the transmission of the first message, the third message containing a first set of initialisation data comprising:

a first certificate including the public key of the first node signed by the certification authority;

a second data set comprising:
an IP address of the first node;
the first certificate associated with the IP address of the first node;
wherein the second data set is signed with the private key of the first node;
at least one fourth message signed with the temporary private key of the first node after transmitting the third message;
at least one sixth message when a fifth message coming from the second node is received by the first node following the transmission of the fourth message, the sixth message comprising a fourth set of initialisation data comprising:
a second certificate comprising the temporary public key of the first node signed with the private key of the first node;
a fifth data set comprising:
the IP address of the first node;
the second certificate associated with the IP address of the first node,
wherein the fifth data set is signed with the temporary private key of the first node.

8. A method for protecting the transmission of data in an ad hoc network, said network comprising a plurality of nodes, with the data being transmitted according to a routing protocol of a $p^{th}$ node to a $q^{th}$ node, with each node comprising a private key, a public key, a certificate of the public key signed by a certification authority, a temporary private key and a temporary public key, wherein the temporary keys comprise a predefined life span, with a new pair generated at the end of the life span of the preceding pair, the method comprising transmitting by the $p^{th}$ node to a $q^{th}$ node routing data coming from the first node, with said data transmitted comprising:
at least one first message signed with the temporary private key of the first node;
at least one third message when a second message coming from the second node is received by the first node following the transmission of the first message, the third message comprising:
either a first set of initialisation data comprising:
the first certificate comprising the public key of the first node signed by the certification authority;
a second data set comprising:
an IP address of the first node;
the first certificate associated with the IP address of the first node;
wherein the second data set is signed with the private key of the first node,
or the first set of initialisation data further comprising:
a second certificate comprising the temporary public key of the first node signed with the private key of the first node;
a third data set further comprising:
the IP address of the first node;
the second certificate associated with the IP address of the first node;
wherein the third data set is signed with the temporary private key of the first node,
or a fourth set of initialisation data comprising:
a second certificate comprising the temporary public key of the first node signed with the private key of the first node;
a fifth data set comprising:
the IP address of the first node;
the second certificate associated with the IP address of the first node;
wherein the fifth data set is signed with the temporary private key of the first node.

9. A method for controlling authentication data by a second node, with the authentication data making it possible to provide the protecting of useful data exchange transiting from a first node to a second node, with the data being transmitted according to a routing protocol from a first node to a second node, each node comprising a private key, a public key, and a certificate of the public key signed by a certification authority, the method comprising:
transmitting by the first node to the second node:
at least one first message signed with the private key of the first node;
at least one third message when a second message coming from the second node is received by the first node following the transmission of the first message, the third message containing a first set of initialisation data comprising:
a first certificate including the public key of the first node signed by the certification authority;
a second data set comprising:
an IP address of the first node;
the first certificate associated with the IP address of the first node, wherein the second data set is signed with the private key of the first node;
extracting the data received by the second node including:
an identifier of a generator node extracted from a header of the signature of the first message sent by the first node and;
the signature of the first message sent by the first node and;
the first certificate extracted from the third message sent by the first node and;
the second data set signed with the private key of the first node of the third message;
generating a request for the security elements upon receiving the first message to the first node if the first node is unknown to the second node or if the first message is not authenticated by the second node;
recording the data extracted in a memory of the second node;
verifying the signature associated with the first certificate signed by the certification authority also known to the second node;
verifying possession of the set of keys by the first node with IP address by verifying the signature of the second data set signed with the private key of the first node;
comparing the IP addresses and the identifiers of the first node contained in respectively the first and third messages allowing for a verification of the authentication of the first node; and
verifying the signature of the message using the public key signed by the certification authority.

10. The method as claimed in claim 9, wherein the recording of the data is carried out in such a way as to cause the following three pieces of data to correspond:
a unique identification of the first node;
an IP address IP of the first node;
a first certificate of the public key of the first node signed by the certification authority.

11. The method according to claim 9, wherein:

the extracting of the data received by the second node further comprises:

the second certificate of the third message, the fifth data set signed with the private key of the first node of the third message, the method further comprises a verification of the signature of the second certificate using the public key signed by the certification authority, the method further comprises a verification of the possession of the set of keys by the first node with the IP address by verifying the signature of the fifth data set signed with the private key of the first node, and the method further comprises verifying the signature of the first message using the public key signed with the private key of the first node instead of verifying the signature of the first message using the public key signed by the certification authority.

12. The method as claimed in claim 11, wherein the recording of the data is carried out in such a way as to cause the following four pieces of data to correspond:

a unique identification of the first node;

an IP address IP of the first node;

a first certificate of the public key of the first node signed by the certification authority;

a second certificate of the public key of the first node signed with the private key of the first node.

13. The method according to claim 9, wherein the routing protocol is the OLSR protocol and the first message is a message of the HELLO or TC type.

14. The method according to claim 9, wherein at least one node comprises a mobile terminal.

15. A method for transmitting revoked certificates, wherein if said method is initiated by an owning node of a first certificate:

the owning node of the first certificate transmits a message signed by its current private key to a nearest trusted node stipulating the revocation of its certificates;

the owning node of the first certificate definitively deletes its security elements when it has received a sufficient number of acknowledgement messages of which it has controlled the authenticity;

if said method is initiated by a certification authority:

the certification authority instructs one or several nodes to transmit its list of revoked certificates by an intermediary of a message signed by the certification authority;

if said method is serviced by the nodes of the network:

a node periodically sends its list of revoked certificates by intermediary of a message signed with its temporary private key.

16. A method for managing a certificate revocation list managed by a node in protecting transmission of data in an ad hoc network, the data being transmitted according to a routing protocol from a first node to a second node, each node comprising a private key, a public key, a certificate of the public key signed by a certification authority, a temporary private key, and a temporary public key, wherein the temporary keys comprise a predefined life span, the method comprising:

renewing first and second obsolete certificates by generator nodes;

signing with the private key of the first node at least one first message;

transmitting, by the first node to the second node, the signed first message;

transmitting, by the first node to the second node, at least one third message when a second message coming from the second node is received by the first node following the transmission of the first message, the third message containing a first set of initialisation data comprising:

the first certificate including the public key of the first node signed by the certification authority;

a second data set comprising:

an IP address of the first node; and the first certificate associated with the IP address of the first node, wherein the second data set is signed with the private key of the first node;

a second certificate comprising the temporary public key of the first node signed with the private key of the first node; and a third data set comprising:

the IP address of the first node; and the second certificate associated with the IP address of the first node, wherein the third data set is signed with the temporary private key of the first node;

integrating, by the node, into its list the first and second certificates after the third message is transmitted from the first node to the second node;

integrating, by the node, into its list first and second revoked certificates extracted from an authenticated message, coming from the node that has the ownership and signed with the temporary private key of this node, and transmits an acknowledgement signed with its temporary key to the generator node that owns the revoked certificates;

integrating, by the node, into its list the revoked certificates extracted from a sufficient number of authenticated messages, coming from several nodes and signed with the temporary private key of these nodes; and integrating, by the node, into its list the revoked certificates extracted from an authenticated message, signed by the certification authority and transmitted by third-party nodes.

17. A first node of an ad hoc network comprising a plurality of nodes, the first node comprising:

one or more processors;

memory communicatively coupled to at least some of the processors and storing a first private key, a first public key, a first certificate of the first public key signed by a certification authority, and instructions that when executed by at least some of the processors cause operations comprising signing with the private key of the first node at least one first message;

transmitting to a second node having a second private key, a second public key, and a second certificate of the second public key signed by the certification authority the signed first message according to a routing protocol;

transmitting to the second node at least one third message according to the routing protocol when a second message coming from the second node is received by the first node following the transmission of the first message, the third message comprising a first set of initialisation data comprising:

the first certificate including the first public key signed by the certification authority;

a second data set comprising:

an IP address of the first node; and the first certificate associated with the IP address of the first node, wherein the second data set is signed with the private key of the first node.

18. A receiving node of an ad hoc network comprising a plurality of nodes for controlling authentication data of an emitting node to make possible protecting useful data exchange transiting from the emitting node to the receiving node, the receiving node comprising:

one or more processors;

memory communicatively coupled to at least some of the processors and storing a first private key, a first public key, a first certificate of the first public key signed by a certification authority, and instructions that when executed by at least some of the processors cause operations comprising:

receiving by the receiving node from the emitting node:

at least one first message signed with a private key of the emitting node;

at least one third message after a second message coming from the receiving node is received by the emitting node following the reception of the first message, the third message containing a first set of initialisation data comprising:

a second certificate including a public key of the emitting node signed by the certification authority;

a second data set comprising:

an IP address of the emitting node;

the second certificate associated with the IP address of the emitting node, wherein the second data set is signed with the private key of the emitting node;

extracting the data received by the receiving node including:

an identifier of a generator node extracted from a header of the signature of the first message sent by the emitting node and;

the signature of the first message sent by the emitting node and;

the second certificate extracted from the third message sent by the emitting node and;

the second data set signed with the private key of the emitting node of the third message;

generating a request for the security elements upon receiving the first message to the emitting node if the emitting node is unknown to the receiving node or if the first message is not authenticated by the receiving node;

recording the data extracted in a memory of the receiving node;

verifying the signature associated with the second certificate signed by the certification authority also known to the receiving node;

verifying possession Of the set of keys by the emitting node with IP address by verifying the signature of the second data set signed with the private key of the emitting node;

comparing the IP addresses and the identifiers of the emitting node contained in respectively the first and third messages allowing for a verification of the authentication of the emitting node; and verifying the signature of the message using the public key signed by the certification authority.

* * * * *